United States Patent [19]

Tieke

[11] Patent Number: 4,933,053
[45] Date of Patent: Jun. 12, 1990

[54] CARBAZOLE-CONTAINING, ELECTRICALLY CONDUCTIVE POLYSILOXANES

[75] Inventor: Bernd Tieke, Marly, Switzerland

[73] Assignee: Ciba-Geigy Corporation, Ardsley, N.Y.

[21] Appl. No.: 147,955

[22] Filed: Jan. 25, 1988

[30] Foreign Application Priority Data

Feb. 5, 1987 [CH] Switzerland .......................... 415/87

[51] Int. Cl.$^5$ ............................................... C25B 3/00
[52] U.S. Cl. ............................. 204/59 R; 204/59 QM; 204/72
[58] Field of Search .............. 528/27, 28; 204/59 QM, 204/59 R, 72, 38.3, 20

[56] References Cited

U.S. PATENT DOCUMENTS

| | | | |
|---|---|---|---|
| 3,565,851 | 2/1971 | Neuroth | 528/28 |
| 3,631,087 | 12/1971 | Lewis et al. | 260/448.2 |
| 3,846,462 | 11/1974 | Proka et al. | 528/28 |
| 3,957,725 | 5/1976 | Limburg | 260/46.5 R |

FOREIGN PATENT DOCUMENTS

3541161 5/1987 Fed. Rep. of Germany .
1073248 2/1984 U.S.S.R. .

OTHER PUBLICATIONS

Aguilera et al., "Polysiloxanes with Mesogenic Groups in the Main and in the Side Chain", International Symposium on Macromolecules, Sep. 1980, Florence, Italy, vol. 3, pp. 306–309.

Ringsdorf et al., "Liquid Crystalline Side Chain Polymers with Low Glass Transition Temperatures", Makromol. Chem. Rapid Commun., vol. 3, pp. 557–562, (1982).

Electrical and Electronic Properties of Polymers, J. J. Kroschwitz, (1988).

Makromol. Chem. Rapid Commun., vol. 7, pp. 71–76, 465–470, 771–775, (1986).

Polymer, vol. 18, pp. 781–785, (1977).

J. Chem. Soc. Chem. Commun., pp. 158–159, 890–892, (1984).

Mol. Cryst. Liqu. Cryst., vol. 105, pp. 175–189, (1984).

*Primary Examiner*—John F. Niebling
*Assistant Examiner*—Steven P. Marquis
*Attorney, Agent, or Firm*—JoAnn Villamizar

[57] ABSTRACT

The present invention relates to electrically conductive polymers obtainable by anodic oxidation of starting polymers consisting of 5–100 mol % of recurring structural units of the formula I and 95–0 mol % of recurring structural units of the formula II

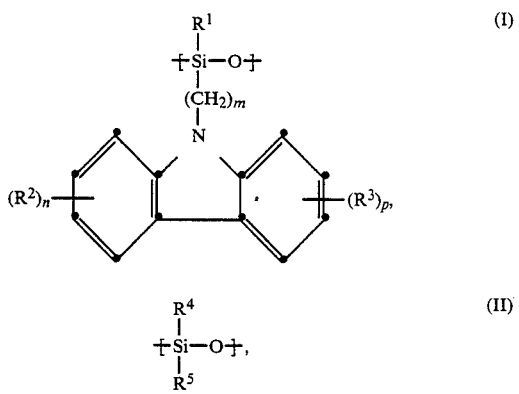

in which $R^1$ and $R^4$ independently of one another are $C_1$–$C_4$alkyl, $C_1$–$C_4$alkoxy, phenyl or phenoxy, $R^2$ and $R^3$ independently of one another are $C_1$–$C_4$alkyl, $C_1$–$C_4$alkoxy, halogen, cyano or nitro, $R^5$ is $C_1$–$C_{18}$alkyl, which is unsubstituted or can be substituted by one or two hydroxyl groups, or is phenyl or hydroxyl, m is an integer from 3–11, and n and p independently of one another are integers from 0 to 2.

The electrically conductive polymers are colored in the visible region, whereas the electrically insulating starting polymers are not colored in this region.

The products are suitable especially as electrochromic display elements, as a positive electrode material or as electrically conductive films.

6 Claims, No Drawings

CARBAZOLE-CONTAINING, ELECTRICALLY CONDUCTIVE POLYSILOXANES

The present invention relates to electrically conductive polymers, obtainable from carbazole-containing polysiloxanes, to processes for preparing the said electrically conductive polymers, to selected starting polymers and to the use of the electrically conductive polymers as electrochromic display elements, as positive electrode materials or as conductive films.

The preparation of conductive polymers by anodic oxidation of starting polymers having carbazole side groups is known. Thus, F. J. Davis et al. describe, in J. Chem. Soc., Chem. Comm., 1984, 890–892, the electrochemical oxidation of poly-(N-vinylcarbazole) films.

Carbazole-containing polysiloxanes (homopolymers) are described by P. Strohriegl in Makromol. Chem., Rapid Commun., 7, 771 (1986). The conversion of these polymers into electrically conductive materials is not mentioned.

Conductive polymers based on polysiloxane have hitherto not been disclosed. Such materials are of potential interest for several reasons; the starting material is relatively easy to prepare and has good flexibility and good film-forming properties.

It has now been found that polysiloxanes having carbazole side groups can be oxidized electrochemically and that electrically conductive polymers are thus formed.

The present invention relates to electrically conductive polymers, obtainable by anodic oxidation of starting polymers consisting of 5–100 mol % of recurring structural units of the formula I and 95–0 mol % of recurring structural units of the formula II

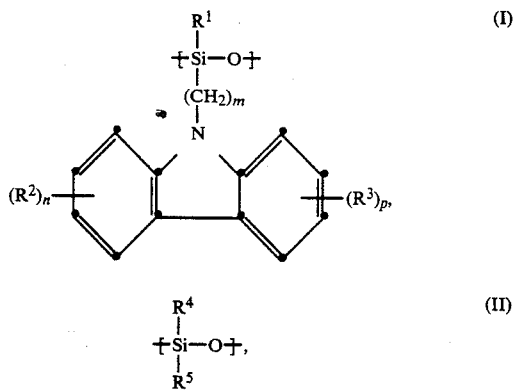

$R^1$ and $R^4$ independently of one another are $C_1$-$C_4$-alkyl, $C_1$-$C_4$alkoxy, phenyl or phenoxy, $R^2$ and $R^3$ independently of one another are $C_1$-$C_4$alkyl, $C_1$-$C_4$alkoxy, halogen, cyano or nitro, $R^5$ is $C_1$-$C_{18}$alkyl which is unsubstituted or can be substituted by one or two hydroxyl groups, or is phenyl or hydroxyl, m is an integer from 3–11 and n and p independently of one another are integers from 0 to 2.

Any $C_1$-$C_4$alkyl substituents are here branched or especially straightchain radicals. Examples of these are methyl, ethyl, n-propyl, isopropyl, n-butyl or sec-butyl. Methyl, ethyl, n-propyl and n-butyl are preferred, in particular methyl and ethyl and very especially methyl. Any $C_1$-$C_4$"alkoxy substituents are here branched or especially straight-chain radicals. Examples of these are methoxy, ethoxy, n-propoxy, isopropoxy, n-butoxy or sec-butoxy. Methoxy, ethoxy, n-propoxy or n-butoxy are preferred, in particular methoxy or ethoxy and very especially methoxy.

$C_1$-$C_{18}$alkyl $R^5$ is, for example, as defined above for $C_1$-$C_4$alkyl or additionally can be, for example, n-pentyl, n-hexyl, n-heptyl, noctyl, n-nonyl, n-decyl, n-undecyl, n-dodecyl, n-tetradecyl, n-hexadecyl or n-octadecyl.

Preferably, $R^5$ is $C_1$-$C_4$alkyl and especially methyl.

Halogen $R^2$ or $R^3$ can be fluorine, chlorine, bromine or iodine. Chlorine, bromine or iodine are preferred, and very especially bromine or iodine.

In $C_1$-$C_{12}$alkyl $R^5$ which is substituted by one or two hydroxyl groups, the hydroxyl groups are located on different carbon atoms, preferably on adjacent carbon atoms or on the ω-carbon atom. Examples of preferred radicals are 2-hydroxyethyl, 3-hydroxypropyl or 2,3-dihydroxypropyl.

The index m designates the length of the alkylene chain between the siloxane structure and the carbazole chromophore. This index is preferably an integer from 3–6 and with very particular preference 3.

The indices n and p designate the number of substituents on the carbazole chromophore. Preferably, these indices have the same values, but they can also be different. These indices are preferably 0 or 1, but with very particular preference 0.

Preferred electrically conductive polymers are derived from starting polymers which consist essentially of recurring structural units of the formula I.

Those electrically conductive polymers are particularly preferred which are derived from starting copolymers which contain 10–95 mol %, especially 50–85 mol %, of recurring structural units of the formula I and 90–5 mol %, especially 50–15 mol %, of recurring structural units of the formula II.

Those electrically conductive polymers are very particularly preferred in which $R^1$ and $R^4$ independently of one another are methyl or phenyl, $R^5$ is methyl, ethyl or hydroxyl, m is an integer from 3–6 and n and p are 0.

Those electrically conductive polymers are also preferred which are derived from starting copolymers as defined above, and in which $R^1$ and $R^4$ are methyl, $R^5$ is hydroxyl or methyl, m is 3 and n and p are 0.

In the starting copolymers, the nature and quantity of the comonomeric siloxane structural elements of the formula II used can be varied; different structural elements of the formulae I and/or II can here also be incorporated simultaneously into a starting copolymer. It is thus possible, with the given structural element of the formula I, to make starting materials available which have desired mechanical or thermal properties, for example a defined flexibility or glass transition point.

These copolymers are novel and are likewise a subject of the present invention. The starting copolymers can be so-called random copolymers or block copolymers.

The molecular weight of the starting homopolymers or copolymers used can vary within wide limits and is, for example, between 1,000 and 1,000,000 (number average).

The structure of the electrically conductive polymer is not known with certainty. Presumably, analogously to the oxidation of poly-(N-vinylcarbazole), a cationic product is formed which is crosslinked via the carbazole groups and into which the anions of the conductivity salt are incorporated and which may react with the solvent. These reactions are sketched in the scheme below, taking a homopolymeric starting material as an example. Analogous crosslinking steps would probably proceed in the case of the copolymeric starting materials (compare the article by F. J. Davis et al., cited above).

Scheme (oxidation of homopolymeric carbazole-containing polysiloxanes):

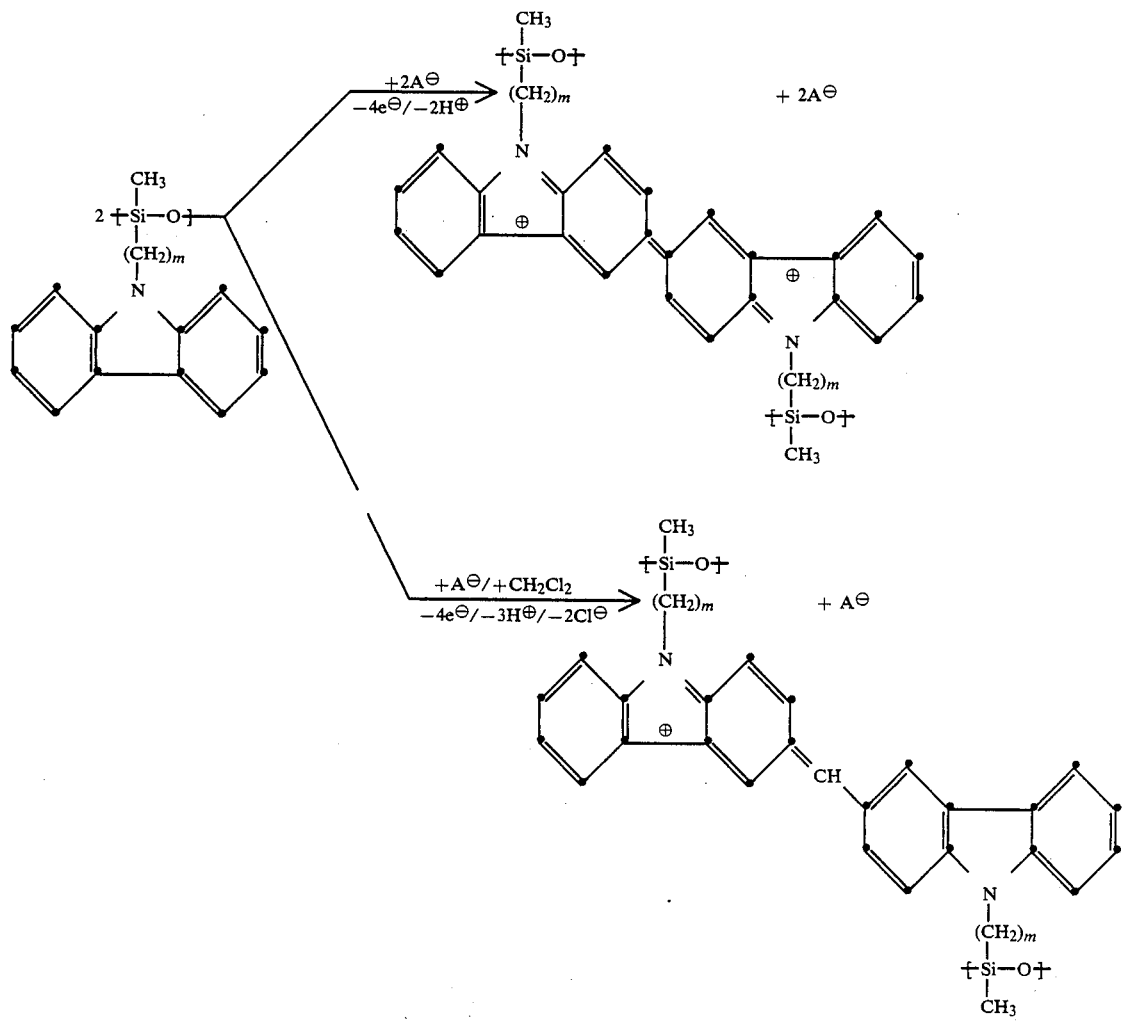

A$^{\ominus}$:Anion of the conductivity salt CH$_2$Cl$_2$:Solvent

The electrically conductive polymers of this invention can be obtained by anodic oxidation of the starting polymers containing the structural elements of the formula I and, if appropriate, of the formula II.

Carbazole groups linked to a polymer structure via spacer groups have hitherto not been electrochemically oxidized.

Appropriately, the following preparation processes are selected:

(A) A starting polymer or a mixture of different starting polymers is dissolved in an electrolyte, which contains a dissolved conductivity salt, and the conductive polymer is then anodically deposited or (B) An electrode is coated with a film of a starting polymer or a mixture of starting polymers, and said layer is anodically oxidized in an electrolyte solution which contains a dissolved conductivity salt.

The invention also relates to the preparation processes (A) and (B) as defined above. The anions of the conductivity salt are partially incorporated into the oxidized product. The conductivity salt is added to the electrolyte preferably in the form of the respective protic acid or one of its salts, preferably the tetraalkylammonium salts. Preferred anions are selected from the group comprising BF$_4^-$, PF$_6^-$, AsF$_6^-$, SbF$_6^-$, SbF$_5$(OH)$^-$, SbCl$_6^-$, ClO$_4^-$, HSO$_4^-$, SO$_4^{2-}$, CF$_3$SO$_3^-$, CH$_3$C$_6$H$_4$SO$_3^-$, CF$_3$COO$^-$, HC$_2$O$_4^-$ or [Fe(CN)$_6$]$^{3-}$, alkylsulfate, alkylsulfonate, alkylphosphate or alkylphosphonate as well as combinations of these anions. Particularly preferred anions are PF$_6^-$ and very especially ClO$_4^-$.

The electrolysis is preferably carried out in polar organic solvents which dissolve the starting polymers and the conductivity salt (process A) or which dissolve the conductivity salt and do not dissolve the film of the starting polymer on the electrode (process B). These organic solvents include, for example, alcohols such as hexanol, organic carbonates such as propylene carbonate, ethers such as 1,2-dimethoxyethane, diethylene glycol dimethyl ether, Cellosolve ®, dioxane, THF or methyl-THF, nitriles such as acetonitrile or benzonitrile or nitrobenzene, nitromethane, N-methylpyrrolidone, methylene chloride, dimethyl sulfoxide, dimethylformamide, dimethylacetamide or acetone. The electrolysis bath can, in addition, also contain other constituents, for example water, wetting agents or emulsifiers.

In process (A), the quantity of starting polymers and, if appropriate, cocomponent, present in the electrolyte solution, must be sufficient to ensure a reasonable reaction rate. As a rule, concentrations of more than $10^{-3}$ mol per liter are necessary. The saturation concentration in the particular electrolyte is to be regarded as the upper limit it of the concentration of the starting polymer.

The conductivity salt concentration is preferably 0.001 to 1 mol per liter. Here again, a concentration up to saturation of the electrolyte can be used.

The electrode materials used can be any common electrically conductive substances. These include for example, metals such as copper, aluminium, nickel, steel or especially platinum.

However, graphite, glass coated with a conductive material, such as glass coated with indium-tin oxide (ITO), or conductive polymers, for example polypyrrole formed by anodic oxidation, can also be used.

The electrodes can have any desired shape. Plate-shaped electrodes in a parallel arrangement or cylindrical electrodes which, if necessary, can be rotated about the longitudinal axis can be used.

The coating of the electrode in process (B) is carried out in the manner known to a person skilled in the art, for example by dipping, whirler-coating, knife-coating, curtain-coating, brushing, spraying or reverse-roll coating.

The thickness of the layer (process B) of starting polymer to be applied to the electrode is as a rule not more than 50 $\mu$m, preferably less than 10 $\mu$m.

The electrolysis solution can be moved during the electropolymerization of the monomers. The movement can be effected in any of the known ways, for example by vigorous stirring with paddle stirrers or magnetic stirrers, ultrasonics, vibration or by passing gases (including the gases generated at the cathode) through the electrolyte. However, stirring can also be effected by moving the electrodes.

For the electropolymerization, voltage is applied to the electrodes. This voltage is selected such that it suffices to effect the reaction. This can be a direct voltage or an alternating voltage with a superposed direct voltage fraction. Preferably, direct voltages are used.

The voltage between the electrodes should suffice to oxidize the starting polymers without causing substantial changes in the bath, for example by degradation of constituents of the bath. As a rule voltages between 2 and 12 V, especially between 5 and 9 V, are used.

In general, current densities of up to 1 A/cm$^2$ are used, but preferably current densities of less than 500 mA/cm$^2$ and with very particular preference current densities of less than 50 mA/cm$^2$.

The elctrolysis can also be carried out under an inert gas, or equally in air.

During the electrolysis, an electrolyte temperature between $-20°$ and $30°$ C. is preferably maintained. However, temperatures outside this range are also possible. The temperature limits depend primarily on the electrolyte solution (solidification point or vaporization point). Preferably, the electrolysis is carried out at room temperature.

The products formed are, in contrast to the starting polymers, electrically conductive and intensely coloured in the visible region. Depending on the reaction time, the coloured product is crosslinked to a greater or lesser extent and is thus insoluble or sometimes swellable in the conventional organic solvents.

Surprisingly, the flexibility of the starting polymers is retained in the crosslinked products, so that the latter are suitable for producing electrically conductive coatings or films.

The electrical conductivity of the end products can be varied via the crosslinking density. In process B), the conductivity can be adjusted to a defined value via the electrolysis time. Typical values of the electrical conductivity of the end products are in the range from $10^{-10}$ to $10^{-3}$ (S$\times$cm$^{-1}$).

The redox reaction is at least partially reversible, and decolorization of the polymer can therefore be achieved by changing the polarity. This step is repeatable, so that such polymers can be used as electrochromic display elements.

Some of the starting polymers containing the structural elements of the formula I and, if appropriate, of the formula II are known (homopolymers), or they can be prepared analogously to these compounds.

In this case, poly-(hydrosiloxanes) are reacted with carbazole derivatives containing N-alkenyl groups with a terminal double bond, according to the following equation (compare also the abovementioned article by P. Strohriegl):

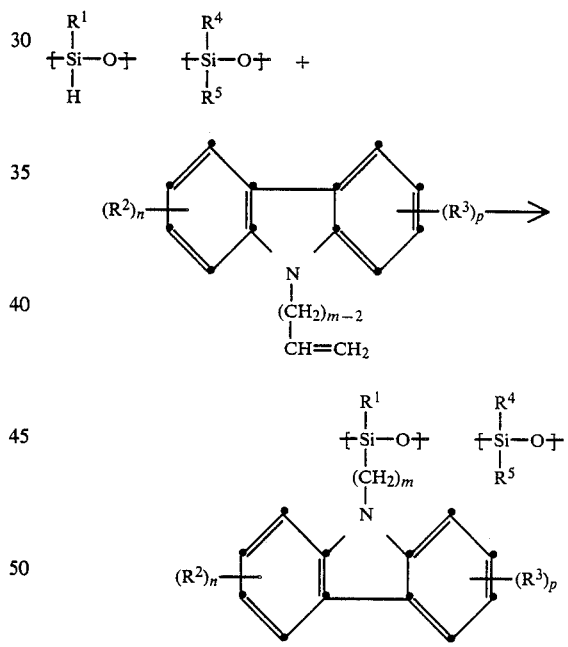

This reaction is catalysed by Pt complexes, for example by H$_2$PCl$_6$.6H$_2$O or (C$_5$H$_5$)$_2$PtCl$_2$.

Some of the poly-(hydrosiloxanes) are commercially available, or they can be obtained analogously to known methods, for example by hydrolysis of dichlorosilanes.

The carbazole derivatives containing N-alkenyl groups with terminal double bonds can be obtained, for example, by reacting Na carbazole (derivatives) and 1-alkenyl-$\omega$-halides.

The electrically conductive polymers can be used in many ways, for example as electrochromic displays, as a positive electrode material (for example for secondary lithium cells) or as conductive films, for example for EMI shielding or for antistatic finishes.

The invention therefore relates also to the use of the electrically conductive polymers for these purposes.

The examples which follow explain the invention in more detail.

EXAMPLE 1
Preparation of N-allylcarbazole 83.6 g (0.5 mol) of carbazole are dissolved in 250 ml of dry DMF. This solution is added dropwise at 0° C. to a suspension of 12.0 g (0.4 mol) of sodium hydride in 500 ml of DMF. An 80% oil suspension of NaH is used. After stirring for a further 2 hours at 0° C., 38 ml (0.45 mol) of allyl bromide are added dropwise. After the end of the addition, the mixture is warmed to room temperature within one hour, with stirring. To decompose residual NaH, 100 ml of methanol are also added. The solvent mixture is then removed in vacuo in a rotary evaporator and the residue is extracted with 400 ml of petroleum ether (40°–60° C.). Finally, the petroleum ether extract is filtered and evaporated in a rotary evaporator. The remaining brownish oil is distilled in a high vacuum. This gives 65.1 g of a pale yellow, microcrystalline solid. Melting point: 52°–54° C., boiling point: 112° C./13 Pa. Yield 78.5% of theory.

Elemental analysis: Calculated for $C_{15}N_{13}N$: 86.92% C, 6.32% H, 6.76% N, Found: 86.81% C, 6.39% H, 6.62% N.

EXAMPLE 2
Preparation of carbazole-containing polysiloxane from Nallylcarbazole and polymethylhydrosiloxane.

12.03 g (0.2 mol) of polymethylhydrosiloxane (Petrarch PS 122, molecular weight $4.5-5 \times 10^3$) and 48.0 g (0.22 mol) of N-allylcarbazole are dissolved under nitrogen in 200 ml of dry THF. 20 ml of a catalyst solution 1 consisting of $H_2PtCl_6.6H_2O$ in THF (concentration: $4 \times 10^{-3}$ mol/l) are added under nitrogen to this mixture. The mixture is stirred for one week at 60°C., during which time the reaction can be followed by the decrease of the Si-H band at 2,080 cm$^{-1}$ in the IR spectrum.

The polymer is precipitated in methanol and purified by repeatedly dissolving it in dichloromethane and reprecipitating it in methanol. Finally, 32.5 g of a colourless, slightly grey powder are obtained. The polymer has a Tg of 50°C. and a viscosity number $[\eta]=0.058$ (measured in toluene at 30°C.). According to the results of the elemental analysis, 2/3 of the allylcarbazole have been added to the Si-H group, and the remaining third has been hydrolysed to Si-OH. Found: 64.38% C, 6.30% H, 4.55% N, 13.58% Si; Calculated for $(2C_{16}H_{17}NOSi.CH_4O_2Si)_n$: 64.88% C, 6.27% H, 4.59% N, 13.79% Si.

The polymer is readily soluble in THF, benzene, toluene and chlorinated hydrocarbons, for example dichloromethane.

EXAMPLE 3
Preparation of carbazole-containing polysiloxane from Nallylcarbazole and polymethylhydrosiloxane.

3.01 g (0.05 mol) of polymethylhydrosiloxane (Petrarch PS 122, molecular weight $4.5-5 \times 10^3$) and 11.4 g (0.055 mol) of N-allylcarbazole are dissolved under nitrogen in 100 ml of dry toluene. 4 mg ($10^{-5}$ mol) of dichlorodicyclopentadiene platinum are added to this mixture. The mixture is then stirred for 48 hours at 60° C, and the reaction can be followed by the decrease of the Si-H at 2,080 cm$^{-1}$ in the IR spectrum.

The polymer is then precipitated in 1 liter of n-hexane and purified by dissolving in THF and reprecipitating in n-hexane. The product is dried at 20°C. in vacuo. This gives 11.25 g of a white powder. The polymer has a glass temperature of 49°C. and a viscosity number $[\eta]=0.111$ (measured in THF at 30°C.). According to the elemental analysis, allylcarbazole has been added to 88% of all the Si-H groups, and the residual Si-H groups have been oxidized to SiOH groups.

Found: 70.31% C, 6.58% H, 4.82% N, 11.06% Si; Calculated for $(8C_{16}H_{17}NOSi.CH_4O_2Si)$: 69.97% C, 6.37% H, 5.06% N, 11.40% Si.

EXAMPLE 4
Preparation of carbazole-containing polysiloxane from Nallylcarbazole and (50%)methylhydro-(50%)dimethylsiloxane copolymer. 13.43 g (0.1 mol) of a (50%)methylhydro-(50%)dimethylsiloxane copolymer (Petrarch PS 122.5, molecular weight 900–1,000) and 24.0 g (0.11 mol) of N-allylcarbazole are dissolved under nitrogen in 150 ml of dry THF. 21 mg of $H_2PtCl_6.6H_2O$ are also added as a catalyst to this mixture. The mixture is then boiled under reflux for about one week. After this time, the reaction is complete. This can be demonstrated by the disappearance of the Si-H band at 2,080 cm$^{-1}$ in the IR spectrum.

The polymer is precipitated in methanol and purified by repeated dissolution in dichloromethane and reprecipitation in methanol. Finally, this gives 26.3 g of a slightly brownish, viscous substance, which solidifies as a glass when cooled with ice. The polymer has a Tg of 14° C. and a viscosity number $[\eta n]=0.031$ (measured in THF at 30°C.).

Elemental analysis: Found: 63.58% C, 6.85% H, 4.01% N, 16.00% Si; Calculated for $(C_{16}H_{17}NSiO.C_2H_6SiO)_n$ n: 63.30% C, 6.79% H, 4.10% N, 16.45% Si.

EXAMPLE 5
Preparation of carbazole-containing polysiloxane from Nallylcarbazole and (15%)methylhydro-(85%)diethylsiloxane copolymer.

21.11 g (0.05 mol) of a (15%)methylhydro-(85%)di®ethylsiloxane copolymer (Petrarch PS 123.5, molecular weight 2,000–2.500) and 11.4 g (0.052 mol) of N-allylcarbazole are dissolved under nitrogen in 50 ml of dry THF. 13 mg of $H_2PtCl_6.6H_2O$ are also added as a catalyst to this mixture. The mixture is then stirred for 12 hours at 50°C. After this time the reaction is completed, as can be demonstrated by the disappearance of the Si-H band at 2,080 cm$^{-1}$ in the IR spectrum.

The solvent is distilled off and the residue is shaken twice with 100 ml of methanol. The residue is then separated off, dissolved in 100 ml of methylene chloride and dried with $CaC_2$. After filtration, the methylene chloride is distilled off and the residue is dried at 50°C. in vacuo. This gives 17.1 g of a turbid, highly viscous liquid which solidifies as a glass when cooled with dry ice. The polymer has a Tg of −45°C. and a viscosity number $[\eta]=0.055$ (measured in THF at 30°C.), Elemental analysis: Found: 45.45% C, 7.68% H, 1.60% N, 28.93% Si; Calculated for $(1.5\ C_{16}H_{17}NSiO . 8.5\ C_2H_6SiO)_n$: 47.74% C, 7.48% H, 2.04% N, 27.23% Si.

EXAMPLE 6
Preparation of carbazole-containing polysiloxane from Nallylcarbazole and (50%)methylhydro-(50%)methyl-n-octylsiloxane copolymer.

8.75 g (0.05 mol) of a (50%)methylhydro-(50%)methyl-n-octylsiloxane copolymer (Petrarch PS 125, molecular weight 400–600) and 11.4 g (0.052 mol) of N-allylcarbazole are dissolved under nitrogen in 100 ml of dry toluene. 2 mg of dichlorodicyclopentadiene platinum are added as a catalyst to this mixture, which is then stirred for 30 hours at 60°C. After this time, the reaction is complete, as can be demonstrated by the disappearance of the SiH band at 2,080 cm$^{-1}$ in the IR spectrum.

The polymer is precipitated in 800 ml of methanol and purified by dissolving in 50 ml of THF and reprecipitating in 1 liter of methanol. The product is dried at 50°C. in vacuo. This gives 13.6 g of a highly viscous mass which solidifies as a glass when cooled with dry ice. The polymer has a glass temperature of −20°C. and a viscosity number $[\eta n]=0.167$ (measured in THF at 30°C.).

Elemental analysis: Found: 64.42% C, 8.60% H, 2.89% N, 13.32% Si; Calculated for $C_{16}H_{17}NOSi.C_9H_{20}OSi$): 68.28% C, 8.48% H, 3.19% N, 12.79% Si.

EXAMPLE 7-13

Preparation of electrically conductive polymers by anodic oxidation of the polysiloxanes from Examples 2-6. 0.01 mol of polymer from Examples 2-6 and 0.02 mol of electrolyte salt (see Table 1) are dissolved in 200 ml of dry methylene chloride, and the solution is flushed for 30 minutes with argon. Two platinum electrodes (50×20×1 mm) are immersed into the solution. When the current is switched on (current density 1 mA/cm$^{-2}$), a blue green precipitate forms on the anode. The electrolysis is carried out for one hour.

After this time, a film has formed which is then purified by twice rinsing for 30 minutes with methylene chloride and dried for 12 hours in a high vacuum.

The film material obtained is infusible and insoluble in the conventional organic solvents. For further data relating to the preparation conditions and specific conductivities, see Table 1.

EXAMPLE 14

Preparation of an electrically conductive polymer by anodic oxidation of an electrode precoated with a polysiloxane film.

2 g of the polysiloxane from Example 2 are dissolved in 20 ml of methylene chloride. Using this solution, an about 1 μp thick polymer film is produced by spin-coating (30 seconds each at 900 and 3,000 r.p.m.) on a platinum electrode (50×20×1 mm). The electrode coated on both sides is then immersed together with an uncoated electrode into an electrolyte solution and connected as the anode. The electrolyte solution contains 0.02 mol of $[(C_4H_9)_4N]PF_6$ in 200 ml of dry propylene carbonate. After flushing for 30 minutes with argon, the current (voltage 5 V, current density 0.1 mA/cm$^2$) is switched on. The polymer-coated anode immediately assumes a dark green colour. After an electrolysis time of 1 hour, the current is switched off, the coated electrode is washed in 100 ml of dry propylene carbonate and then dried at 80 °C. in a high vacuum. This gives a black-green film which is infusible and insoluble in conventional solvents. The specific conductivity σ is $4.7\times10^{-9}$ S cm$^{-1}$.

TABLE 1

Preparation conditions and specific conductivities of the anodically oxidized polysiloxane films

| Example No. | Polymer from Example | Conductivity salt | Voltage [V] | Current density [mA/cm$^2$] | Yield [mg] | σ [S cm$^{-1}$] |
|---|---|---|---|---|---|---|
| 7  | 2 | $[(C_4H_9)_4N]BF_4$   | 7.23 | 1   | 123 | $9.7 \times 10^{-5}$ |
| 8  | 2 | $[(C_4H_9)_4N]PF_6$   | 6.66 | 1   | 85  | $3.4 \times 10^{-4}$ |
| 9  | 2 | $[(C_4H_9)_4N]ClO_4$  | 7.16 | 1   | 162 | $8.3 \times 10^{-4}$ |
| 10 | 3 | $[(C_4H_9)_4N]ClO_4$  | 7.00 | 1   | 75  | $4.6 \times 10^{-4}$ |
| 11 | 4 | $[(C_4H_9)_4N]ClO_4$  | 7.90 | 1   | 21  | $1.6 \times 10^{-4}$ |
| 12 | 5 | $[(C_4H_9)_4N]ClO_4$  | 5.75 | 0.5 | 14  | $1.7 \times 10^{-6}$ |
| 13 | 6 | $[(C_4H_9)_4N]ClO_4$  | 9.23 | 1   | 28  | $2.5 \times 10^{-5}$ |

EXAMPLE 15

Production of an electrochromic display. Two electrolyte solutions are made up first. Solution 1 contains 1 mol of $[(C_4H_9)_4N]ClO_4$ and 0.5 mol of the polymer from Example 2 in 10 ml of dry methylene chloride. Solution 2 contains 1 mol of $[(C_4H_9)_4N]ClO_4$ in 10 ml of dry methylene chloride. A test cell consisting of a Teflon frame (45×40×10 mm) of 5 mm wall thickness and two ITO coated glass panes (50×40×1 mm) as transparent side walls (ITO: indium-tin oxide) is filled with solution 1. The solution is flushed for 30 minutes with argon and then electrolysed at 4.3 V. A green film having $\lambda_{max}=825$ nm is formed on the anode. An optical density $OD_{800}$ (at $\lambda=800$ nm) of 2 is reached after one minute. The current is then switched off and solution 1 is exchanged for solution 2. The solution is again flushed for 30 minutes with argon. The polarity is then reversed and a voltage of U=2.0 V is applied. The film is decolorized. When $OD_{800}$ has fallen to 0.1, the polarity is reversed again and a voltage of U =3.0 V is applied. The film reassumes a green colour. The charge and discharge steps are easily reversible.

EXAMPLE 16

The procedure followed is as in Example 15, but with the difference that the film is discharged at U=2.0 V and charged at U=4.5 V. On charging, the film assumes a blue colour ($\lambda_{max}$700 nm). The charge and discharge steps are easily reversible.

EXAMPLE 17

The procedure followed is as in Example 15, but with the difference t-at the polymer from Example 3 is used in place of the polymer from Example 2. Again, a green film is obtained in the charged state ($\lambda max=825$ nm) and a colourless film is obtained in the discharged state. The charge and discharge steps are easily reversible.

EXAMPLE 18

1 g of the polymer from Example 2 is dissolved in 10 ml of methylene chloride. Using this solution, an about 0.1 μthick polymer film is produced on an ITO-glass pane (50×40×1 mm) by spin-coating (30 seconds each at 1,500 r.p.m. and 3,000 r.p.m.). The ITO-coated side of the glass pane is coated with the polymer. The glass pane is then installed in the test cell. The test cell is filled with 10 ml of a 0.1 molar solution of $](C_4H_9)_4N]ClO_4$ in propylene carbonate, flushed for 30 minutes with argon and then electrolysed, the polymer-coated ITO-glass pane being connected as the anode (U=4.0 V). The polymer film rapidly assumes a green colour ($\lambda_{max}=825$ nm). When $OD800=2$ has been reached, the polarity is reversed and the electrolysis is continued at U=1.0 V. The film is decolorized again. The charge and discharge steps are easily reversible.

What is claimed is:

1. A process for preparing an electrically conductive polymer comprising the steps of
   (i) dissolving a starting polymer consisting of 5-100 mol % of recurring structural units of the formula I and 95-0 mol % of recurring structural units of the formula II

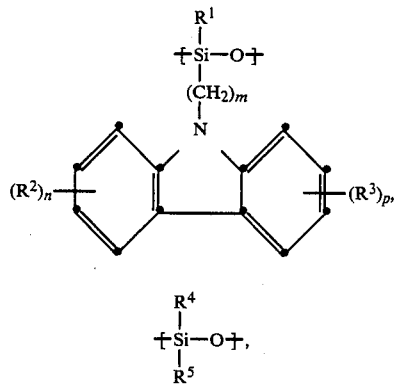

in which $R^1$ and $R^4$ independently of one another are $C_1$-$C_4$alkyl, $C_1$-$C_4$alkoxy, phenyl or phenoxy, $R^2$ and $R^3$ independently of one another are $C_1$-$C_4$alkyl, $C_1$-$C_4$alkoxy, halogen, cyano or nitro, $R^5$ is $C_1$-$C_{18}$alkyl which is unsubstituted or can be substituted by one or two hydroxyl groups, or is phenyl or hydroxyl, m is an integer from 3-11, and n and p independently of one another are integers from 0 to 2, in an electrolyte which contains a dissolved conductivity salt, which electrolyte is in an electrochemical cell comprising an anode and cathode, and
   (ii) electrochemically depositing said conductive polymer on the anode.

2. A process according to claim 1, wherein said starting polymer consists essentially of the recurring structural units of formula I.

3. A process according to claim 1, wherein said starting polymer consists essentially of 10-95 mol % of the recurring structural units of formula I and 90-5 mol % of recurring structural units of formula II.

4. A process according to claim 1, wherein said starting polymer consists essentially of 50-85 mol% of the recurring structural units of the formula I and 50-15 mol % of recurring structural units of formula II.

5. A process according to claim 1, wherein $R^1$ and $R^4$ independently of one another are methyl or phenyl, $R^5$ is methyl, ethyl or hydroxy, m is an integer from 3-6 and n and p are 0.

6. A process according to claim 3, wherein $R^1$ and $R^4$ are methyl, $R^5$ is hydroxyl or methyl, m is 3 and n and p are 0.

* * * * *